Dec. 21, 1965  H. STRASSER  3,224,351
STRUCTURE FOR RENDERING A ZOOM LENS OPTIONALLY
ADJUSTABLE BY HAND OR BY MOTOR
Filed July 17, 1962  2 Sheets-Sheet 1
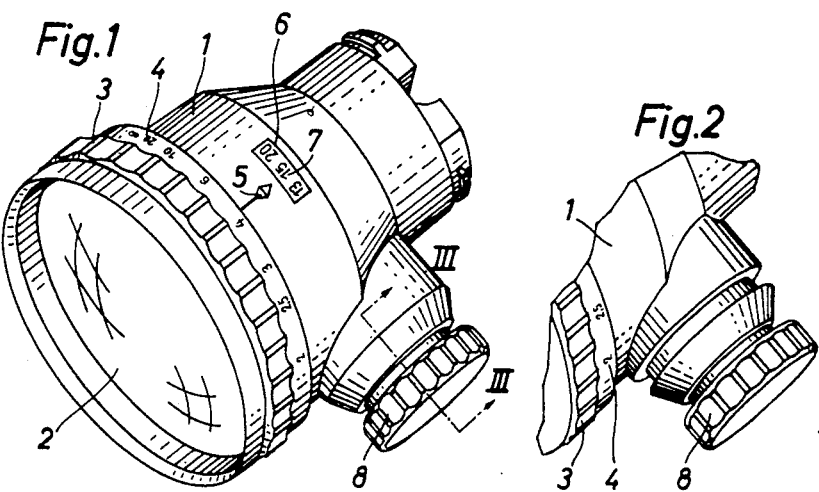
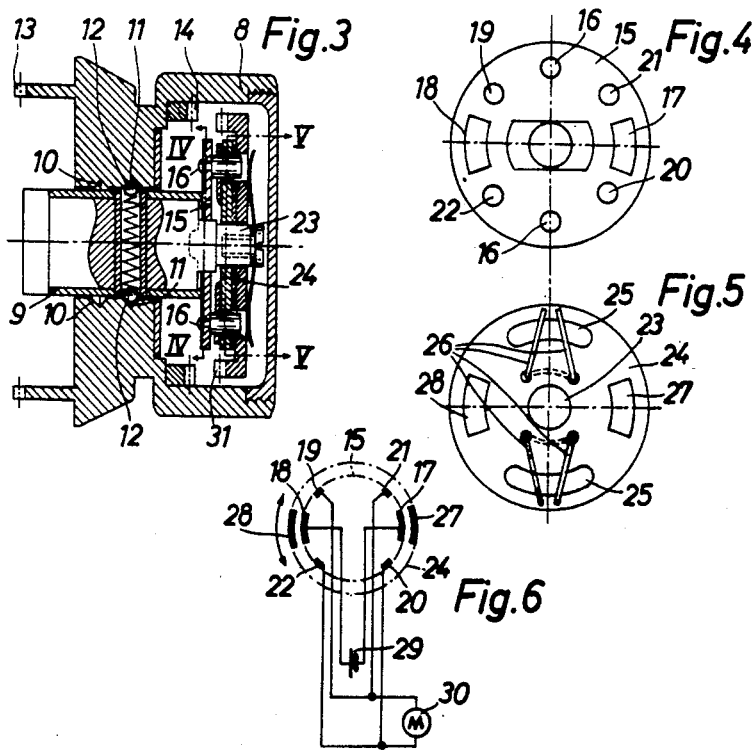
INVENTOR.
HELMUT STRASSER
BY
Michael J. Striker 3,224,351
STRUCTURE FOR RENDERING A ZOOM LENS OPTIONALLY ADJUSTABLE BY HAND OR BY MOTOR
Helmut Strasser, Munich-Solln, Germany, assignor to Agfa Aktiengesellschaft, Leverkusen-Bayerwerk, Germany, a corporation of Germany
Filed July 17, 1962, Ser. No. 210,529
Claims priority, application Germany, July 29, 1961, A 38,012
6 Claims. (Cl. 95—45)

The present invention relates to photographic structure and more particularly to zoom lenses, which are lenses capable of being adjusted so as to be provided with a selected focal length.

The present invention particularly deals with a zoom lens which can be adjusted either by hand or by motor.

One of the objects of the present invention is to provide a structure for optionally adjusting a zoom lens by hand or by motor and which at the same time will occupy an extremely small amount of space so that the camera structure is not rendered undesirably bulky because of the presence of structure which permits the operator optionally to bring about the adjustment of the zoom lens by hand or by motor.

It is also an object of the present invention to provide a structure of the above type which will avoid the presence of cables and the like at the exterior of the zoom lens and camera for making the necessary electrical connections between an electric motor, for example, and the structure for controlling the electric motor which is used to drive the structure for changing the focal length of the zoom lens.

An additional object of the present invention is to provide a structure of the above type which makes it possible to very conveniently mount either on the zoom lens itself or on the camera which carries the zoom lens a motor for driving the structure which adjusts the focal length of the zoom lens.

A particularly important object of the present invention is to provide for a structure of the above type a single, manually-operable member which is the only member the operator need actuate in order to bring about adjustment of the focal length of the zoom lens either by hand or by motor.

With these objects in view the invention includes, in a structure which is adapted to be used with a zoom lens, an elongated support means and a single manually shiftable actuating means carried by the support means for shiftable movement therealong. The support means supports the manually shiftable means for movement between a hand-position where the shiftable means is adapted to participate in hand operation of structure for changing the focal length of the zoom lens and a motor-position where the shiftable means is adapted to participate in the control of a motor which drives the structure for changing the focal length of the zoom lens.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a perspective illustration of a zoom lens provided with the structure of the invention, and the structure of the invention is shown in FIG. 1 in the position it takes for providing hand-operation of the structure for changing the focal length of the zoom lens;

FIG. 2 fragmentarily illustrates part of the structure of FIG. 1 shown in a position for providing control of a motor which drives the structure for adjusting the focal length of the zoom lens;

FIG. 3 is a sectional view on an enlarged scale taken along line III—III of FIG. 1 in the direction of the arrows, FIG. 3 illustrating the details of the structure of the invention;

FIG. 4 is a view taken along line IV—IV of FIG. 3 in the direction of the arrows and showing part of an electrical switch structure used for the control of an electric motor which is adapted to drive the structure for adjusting the focal length of the zoom lens;

FIG. 5 is a view taken along line V—V of FIG. 3 in the direction of the arrows and showing another part of the electrical switch structure which is adapted to cooperate with the part thereof shown in FIG. 4;

FIG. 6 is a wiring diagram illustrating how the switch structure of FIGS. 3–5 controls an electric motor and FIG. 7 is an axial section through the objective and illustrates the manner in which the movable lenses can be moved with reference to the stationary components of the zoom lens.

Figure 7:
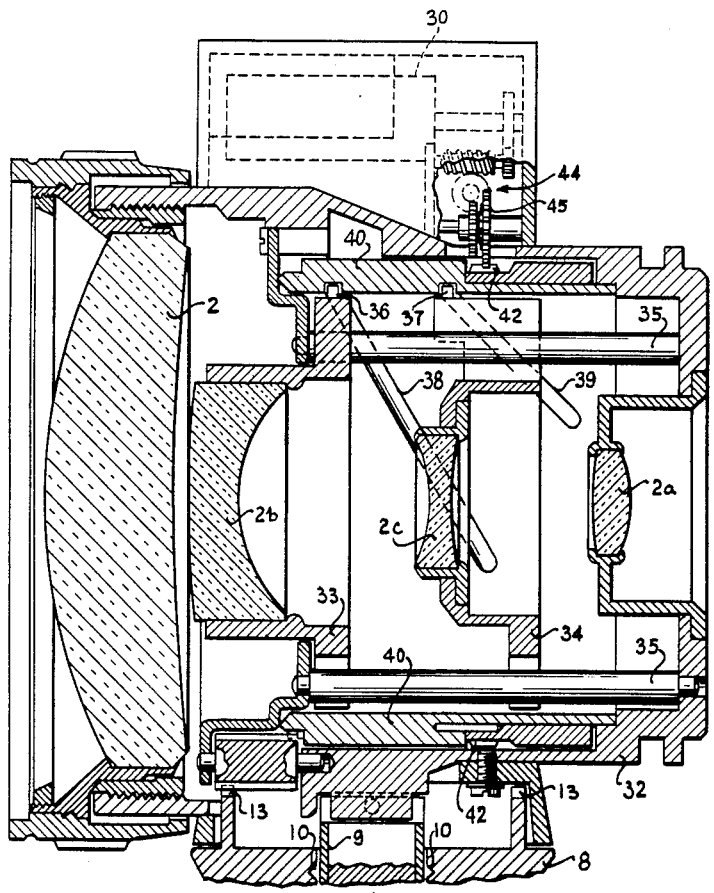

Referring now to the drawings, there is shown in FIGS. 1 and 2 a housing 1 of a zoom lens which is provided with a focussing ring 3 for focussing the lens on a subject which is to be photographed. A scale 4 of distances between the subject and the camera cooperates with the ring 3, and the scale 4 turns with the ring 3 and cooperates with a stationary index 5 carried by the exterior of the housing 1 of the zoom lens. This index 5 also cooperates with a scale 7 having graduations which indicate the focal length of the zoom lens at any given moment, and the housing 1 is provided with a window 6 through which the scale 7 is visible, and the manner in which the index 5 cooperates with the scale 7 at the window 6 is clearly indicated in FIG. 1. The scale 7 is mounted on part of the structure which moves during a change in the focal length of the zoom lens so that the particular graduation of the scale 7 which is located opposite the index 5 will indicate the focal length to which the zoom lens has been set. The scale 7 may be located either on a part of the objective which moves during adjustment of its focal length or on a transmission element which transmits the drive to parts of the objective, such an element being, for example, a rotary gear.

At one side of the zoom-lens housing 1 is located an actuating member here shown as a knob 8 which forms a single shiftable means, as described below, for providing adjustment of the zoom lens either by hand or by motor, so that with the structure of the invention the operator need only actuate the knob 8 in order to bring about either adjustment by hand or adjustment from a motor drive. The knob or shiftable means 8 is shown in FIG. 1 in an inner position where it provides adjustment of the zoom lens by hand, and the knob 8 is shown in FIG. 2 in an outer position where the knob 8 can be actuated by the operator to provide adjustment of the focal length by a motor drive. Thus, the inner position of FIG. 1 is referred to below as a hand-position while the outer position of FIG. 2 is referred to below as a motor-position. The motor 30 (see FIGS. 6 and 7) may be arranged either at a suitable part of the unillustrated camera or, and as shown in FIG. 7, at a suitable part of the objective, and under certain circumstances this motor can be coupled to the transmission which is used for hand-adjustment of the focal length. Of course, it is possible to provide for the motor-driven adjustment of the focal length a drive which is in addition to that which is used during hand-operation. Moreover, it is possible to provide a structure where the motor can be attached either to the camera or to the objective at any time so that the user has the advantage of being able to purchase the camera without requiring purchase of the motor when the camera is initially purchased and then at any later time the motor can be purchased as an additional accessory of the camera and can be attached thereto to provide motor-driven operation of the structure for adjusting the zoom lens. In order to render the additional structure required for motor operation of the focal-length adjusting structure to be as simple and compact as possible without requiring any projecting parts or loose cables at the exterior of the camera so as to protect it to a considerable extent against injury, the knob 8 which is used for hand adjustment of the focal length has, in accordance with the present invention, an electrical switch, for controlling an electric motor, built into the knob 8 so that this knob 8 can be used not only for hand adjustment but also for controlling an electric motor where there is a motor-driven adjustment of the focal length of the zoom lens.

As was indicated above, the knob 8 forms a single manually shiftable means which will bring about the desired results, and FIG. 3 shows an elongated hollow tube 9 which is carried by a stationary part of the structure and which forms a support means for the shiftable means 8. Thus the elongated support means 9 supports the shiftable means 8 for shifting movement between the hand-position shown in FIG. 1 and the motor-position shown in FIG. 2. A detent means is carried in part by the support means 9 and in part by the shiftable means 8 for releasably holding the latter in either of these positions, and this detent means takes the form of a pair of annular grooves 10 and 11 formed at the inner surface of the shiftable means 8 which is in slidable engagement with the exterior surface of the tube 9, and this tube or support means 9 carries a pair of spring-pressed ball members 12 urged outwardly away from the axis of the tube 9 so that these ball members will snap into either the groove 11, as indicated in FIG. 3, or, after the operator shifts the shiftable means 8 to the right from the position shown in FIG. 3, into the groove 10. In the position shown in FIG. 3 the detent means 10-12 will releasably hold the shiftable means 8 in its hand-position while when the shiftable means 8 is shifted to the right from the position as shown in FIG. 2 the detent means will releasably hold the shiftable means 8 in its motor-position.

When the shiftable means 8 is in the hand-position shown in FIG. 3 it is capable of participating in the hand-operation of the structure for adjusting the focal length of the objective 2, and for this purpose the shiftable means 8 carries a transmission means formed by a gear 13 which coaxially surrounds the tube 9 and which, when the shiftable means 8 is placed in the hand-position shown in FIG. 3, meshes with a transmission which is shown in FIG. 7 and which will be actuated upon rotary movement of the shiftable means 8 so as to change the focal length of the objective. Thus, the shiftable means 8 is longitudinally shiftable along the support means 9 between the positions indicated in FIGS. 1 and 2, and when the shiftable means is in the hand-position shown in FIGS. 1, 3 and 7 the shiftable means 8 can be turned relative to the support means 9 for actuating through the transmission means 13 the structure for changing the focal length of the zoom lens. The shiftable means 8 also fixedly carries a gear 14 which is located in the hollow interior of the shiftable means 8 and which coaxially surrounds the support means 9, and this gear 14 forms a second transmission means which is placed in operative engagement with an electrical switch structure for actuating this switch structure in order to control the electric motor 30 when the shiftable means 8 is turned with respect to the support means 9 after having been shifted to the motor-position of FIG. 2 where the ball members 12 become located in the groove 10.

The elongated hollow tube 9 is fixedly carried by a part 32 of the objective assembly (see FIG. 7) and is thus incapable of moving either axially or circumferentially. The switch structure is carried by the elongated tube 9 which forms the support means. This switch structure includes a disc 15 which carries contact elements and which is mounted on the tube 9. The contact disc 15 is fixedly mounted on the support means 9 so that this disc 15 also remains stationary. The disc 15 fixedly carries a pair of diametrically opposed pins 16 which respectively extend parallel to the axis of the support means 9, and a plurality of contacts 17-22 are carried by and distributed about the disc 15 in the manner shown most clearly in FIG. 4. These contacts are located on the right face of the disc 15, as viewed in FIG. 3. The tube 9 carries a coaxial projection 23 which is located beyond the disc 15, and a second contact disc 24 is carried by the projection 23 for rotary movement relative thereto so that the disc 24 turns around the axis of the elongated support means 9. This disc 24 is provided with a pair of arcuate slots 25 located along a circle whose center is in the axis of turning of the disc 24 and whose radius equals the distance of the pins 16 from this axis, so that these pins 16 are received respectively into the slots 25 and thus the disc 24 is turnable relative to the disc 15 while the slots 25 become displaced with respect to the pins 16, respectively. The disc 24 carries in addition a pair of wire springs 26 each of which has a pair of legs between which a pin 16 is located, so that with this construction the springs 26 cooperate with the pins 16 for releasably retaining the disc 24 in a given angular position with respect to the disc 15, and when the disc 24 is turned from this predetermined angular position it is turned in opposition to the springs 26 which will return the disc 24 to its starting position when this disc 24 is released. The disc 24 carries at its face which is directed toward the disc 15 a pair of contacts 27 and 28 each of which is adapted to bridge a pair of contacts carried by the disc 15, as will be apparent from the description below.

In a manner which is not shown in the drawing and which is indicated only schematically in FIG. 6 electrical leads extend along the hollow interior of the support means 9 to electrically connect a battery 29 (FIG. 6) and the electric motor 30 with the contacts carried by the disc 15. The electric motor 30 is reversable, and when the disc 24 is turned in a clockwise direction, as viewed in FIG. 6, the contact 28 thereof will bridge and place in electrical connection the contacts 18 and 19 of the disc 15 while the contact 27 thereof will bridge and place in electrical connection the contacts 17 and 20 carried by the disc 15. As a result the motor 30 will be driven in one direction and will change the focal length of the objective through the transmission shown in FIG. 7. When the disc 24 is turned from its rest position, where the contacts 27 and 28 are respectively in alignment with the contacts 17 and 18, in a counterclockwise direction, as viewed in FIG. 6, the contact 28 will bridge and place in electrical connection the contacts 18 and 22 of the disc 15 while the contact 27 will bridge and place in electrical connection the contacts 17 and 21 of the disc 15, so that now the motor 30 will be driven in the opposite direction, and thus in accordance with the direction of turning of the disc 24 of the electrical switch means it is possible to increase or decrease the focal length of the zoom lens. A gear 31 is fixed coaxially to the disc 24 and is located in the path of movement of the gear 14 to mesh with the latter when the shiftable means 8 is shifted to its motor-position.

As has been indicated above, when the shiftable means 8 is rotated with respect to the support means 9 with the shiftable means 8 in its hand-position shown in FIGS. 1 and 3, the transmission means 13 will serve to transmit the rotary movement of the shiftable means 8 to a transmission which will change the focal length of the objective, and whether the focal length is increased or decreased will simply depend upon the direction of turning of the shiftable means 8. When the shiftable means 8 is shifted outwardly to its motor-position, shown in FIG. 2, then the gear 13 moves out of operative engagement with the transmission and the gear 14 moves into engagement with the gear 31, so that the turning of the shiftable means 8 will now be capable of turning the disc 24 in one direction or the other for actuating and controlling the motor 30 as described above. In this way also it is possible to increase or decrease the focal length of the objective, and whether the focal length of the objective is increased or decreased by hand or by motor the scale 7 will indicate the size of the focal length at any given moment so that the operator will know when to terminate the adjustment.

FIG. 7 illustrates the objective in section. The zoom lens comprises a first stationary component 2, a second stationary component 2a, and two additional components 2b, 2c located between and movable axially with reference to the components 2, 2a. The mounts 33, 34 of the components 2b, 2c are guided by fixed rods 35 and are provided with followers 36, 37 which respectively extend into cam slots 38, 39 machined into the internal surface of a rotary cylinder 40. This cylinder is provided with two ring gears 41, 42, the gear 41 meshing with a pinion 43 which is journalled in the stationary part 32 of the objective assembly. The pinion 43 meshes with the gear 13 when the knob 8 shifted to the position shown in FIGS. 1, 3 and 7 so that, by rotating the knob 8, the operator drives the pinion 43 which, in turn, rotates the ring gear 41 and cylinder 40. Such rotation of the cylinder 40 causes the followers 36, 37 to travel in the cam slots 38, 39 whereby the components 2b, 2c move axially to adjust the focal length of the zoom lens.

The output shaft of the motor 30 is operatively connected with a worm drive 44 one element of which rotates a pinion 45 meshing with the ring gear 42. Thus, when the knob 8 is shifted to the position of FIG. 3 and disengages the gear 13 from the pinion 43, the gear 14 meshes with the gear 31 so that, in response to rotation of the knob 8 in a clockwise or counterclockwise direction, the motor 30 will drive the cylinder 40 in a sense to move the components 2b, 2c toward or away from the fixed component 2.

Of course, the invention is not limited to the specific details shown in the drawing and described above. In particular, the contact discs 15 and 24 need not have the particular construction shown, but instead any other suitable switch arrangement may be used, preferably a rotary switch arrangement. Moreover, the pair of transmission means 13 and 14 need not necessarily be in the form of gears, since any other known motion transmitting devices capable of being brought into and out of operative positions in response to axial movement can be used. Furthermore, detent structures differing from grooves 10 and 11 and spring-pressed ball members 12 may be used. Also, the shiftable means 8 instead of taking the form of a knob may take the form of a lever, a key, or the like. In addition, instead of using an electric motor for the drive when the focal length is changed by a motor drive, it is possible to use a spring motor, and with such a construction when the shiftable means 8 is moved to its outer, motor-position it will actuate a release structure which releases the spring motor for operation, and in this position the shiftable means 8 can also be connected to a structure for tensioning the spring motor. Under certain circumstances, the shiftable means 8 and the support means 9 therefor as well as the other structure associated therewith can be located not on the housing 1 of the zoom lens but on the still or motion picture camera which carries the zoom lens, if such an arrangement is of advantage for the secure and comfortable holding and operation of the camera.

It is also possible to locate the scale 7 on the camera itself instead of on the zoom lens, in such a case.

It will be understood that each of the elements described above, or two or more together, may also find a useful application in other types of cameras differing from the types described above.

While the invention has been illustrated and described as embodied in zoom lenses, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. For use with a zoom lens, in combination, elongated support means; a single manually shiftable means carried by said support means for longitudinal shifting movement therealong between a hand-position and a motor-position, said support means also supporting said shiftable means for rotary movement relative to said support means; a first gear carried by said shiftable means for movement therewith and adapted to participate in the actuation of structure for changing the focal length of the zoom lens when said manually shiftable means is rotated relative to said support means after said manually shiftable means has been shifted to said hand-position thereof; a second gear carried by said shiftable means for movement therewith; electrical switch means connected electrically with a motor which is adapted to drive a structure for changing the focal length of the objective, said electrical switch means including a third gear located in the path of movement of said second gear when said shiftable means is shifted to said motor-position thereof and meshing with said second gear when said shiftable means is in said motor-position thereof so that upon turning of said manually shiftable means relative to said support means when said shiftable means is in said motor position thereof said second and third gears will cooperate to actuate said switch means for controlling the motor.

2. In a camera objective having a housing and at least one optical component axially displaceable in said housing, in combination, automatic drive means for said component, control means in engagement with said component, a manually rotatable member on said housing shiftable between a first position and an alternate second position parallel to said first position, said member engaging said control means in said first position for displacing said component upon rotation of said member, coupling means controlled by said member operatively connecting said drive means with said control means for automatic displacement of said component upon a shifting of said member into said second position in which said member is disengaged from said control means, and switch means controllable by said member in said second position for energizing said drive means by rotation of said member.

3. In a camera objective having a housing and at least one optical component axially displaceable in said housing, in combination, automatic drive means for said component, control means in engagement with said component, an actuating member on said housing movable by hand between a first operating position and an alternate second operating position, said actuating member engaging said control means in said first operating position thereof for displacing said component upon operation of said actuating member in said first operating position, coupling means controlled by said actuating member operatively connecting said drive means with said control means for automatic displacement of said component upon a movement of said actuating member into said second operating position in which said actuating member is disengaged from said control means, and actuating means controllable by operation of said actuating member in said second operating position thereof for actuating said drive means.

4. In a camera objective having a housing and at least one optical component axially displaceable in said housing, in combination, automatic drive means for said component, control means in engagement with said component, an actuating member mounted on said housing and being shiftable by hand between a first position and an alternate second position, said actuating member being rotatable by hand in each of said positions and engaging said control means in said first position thereof for displacing said component upon rotation of said actuating member in said first position, coupling means controlled by said actuating member for operatively connecting said drive means with said control means for automatic displacement of said component upon shifting of said actuating member into said second position in which said actuating member is disengaged from said control means, and actuating means controllable by rotation of said actuating member in said second position thereof for actuating said drive means.

5. In a camera objective having a housing and at least one optical component axially displaceble in said housing, in combination, an electric motor for automatically displacing said component, control means in engagement with said component, an actuating member mounted on said housing and movable by hand between a first operating position and an alternate second operating position, said actuating member engaging said control means in said first operating position thereof for displacing said component upon operation of said actuating member in said first operating position, coupling means controlled by said actuating member for operatively connecting said electric motor with said control means for automatic displacement of said component upon a movement of said actuating member into said second operating position in which said actuating member is disengaged from said control means, and electric switch means controllable by said actuating member in said second operating position thereof for energizing said electric motor by operation of said actuating member in said second operating position.

6. In a camera objective having a housing and at least one optical component axially displaceable in said housing, in combination, an electric motor for automatically displacing said component, control means in engagement with said component, an actuating member mounted on said housing and being shiftable by hand between a first position and an alternate second position, said actuating member being rotatable by hand in each of said positions and engaging said control means in said first position thereof for displacing said component upon rotation of said actuating member in said first position, coupling means controlled by said actuating member for operatively connecting said electric motor with said control means for automatic displacement of said component upon shifting of said actuating member into said second position in which said actuating member is disengaged from said control means, and switch means controllable by said actuating member in said second position for energizing said electric motor by rotation of said actuating member in said second position thereof.

References Cited by the Examiner
UNITED STATES PATENTS

| | | | |
|---|---|---|---|
| 1,950,166 | 3/1934 | Durholz | 95—45 |
| 2,773,732 | 12/1956 | Roberts | 352—39 |
| 3,095,794 | 7/1963 | Raab | 95—45 |

JOHN M. HORAN, *Primary Examiner.*

NORTON ANSHER, *Examiner.*